United States Patent [19]
Nagorcka

[11] Patent Number: 5,340,205
[45] Date of Patent: Aug. 23, 1994

[54] SUSPENSION SYSTEM FOR A TRACKED VEHICLE

[75] Inventor: James A. Nagorcka, Tarrington, Australia

[73] Assignee: Deere & Company, Moline, Ill.

[21] Appl. No.: 85,212

[22] Filed: Jun. 30, 1993

Related U.S. Application Data

[63] Continuation-in-part of Ser. No. 976,090, Nov. 13, 1992.

[51] Int. Cl.$^5$ .................... B62D 55/14; B62D 55/30
[52] U.S. Cl. .......................... 305/22; 305/10; 305/29
[58] Field of Search ............... 305/10, 21, 22, 23, 305/24, 25, 27, 28, 29, 30, 31, 32

[56] References Cited

U.S. PATENT DOCUMENTS

| | | | |
|---|---|---|---|
| 1,786,430 | 12/1930 | Kegresse | 305/22 X |
| 2,467,947 | 4/1949 | Skelton | 305/22 X |
| 3,343,889 | 9/1967 | Bexten | 305/22 X |
| 3,774,708 | 11/1973 | Purcell et al. | 305/27 X |
| 4,339,156 | 7/1982 | Livesay . | |
| 4,361,363 | 11/1982 | Livesay . | |
| 4,373,758 | 2/1983 | Livesay . | |
| 4,519,654 | 5/1985 | Satzler et al. . | |

FOREIGN PATENT DOCUMENTS

| | | | |
|---|---|---|---|
| WO90/05996 | 4/1993 | PCT Int'l Appl. . | |
| 724382 | 3/1980 | U.S.S.R. | 301/27 |
| 882811 | 11/1981 | U.S.S.R. | 301/10 |
| 1745604 | 7/1992 | U.S.S.R. | 301/10 |

*Primary Examiner*—Russell D. Stormer

[57] ABSTRACT

An active suspension system for a tracked vehicle having a main drive wheel and two idlers which are surrounded by a track. The suspension system is provided with a walking beam that is pivotally mounted to the supporting structure of a vehicle by a walking beam pivot. The beam having a first section and a second section. An angled first arm is pivotally coupled to the first section of the walking beam and to which the first idler is rotatably mounted. A second telescoping arm is pivotally mounted to the supporting structure at the walking beam pivot to which the second idler is rotatably mounted. Three track rollers are operatively coupled to the angled arm by an angled link. Two of the track rollers are rotatably mounted to a bridging member which is pivotally coupled to the first arm of the angled link. The third track roller is rotatably mounted to the second arm of the angled link.

10 Claims, 2 Drawing Sheets

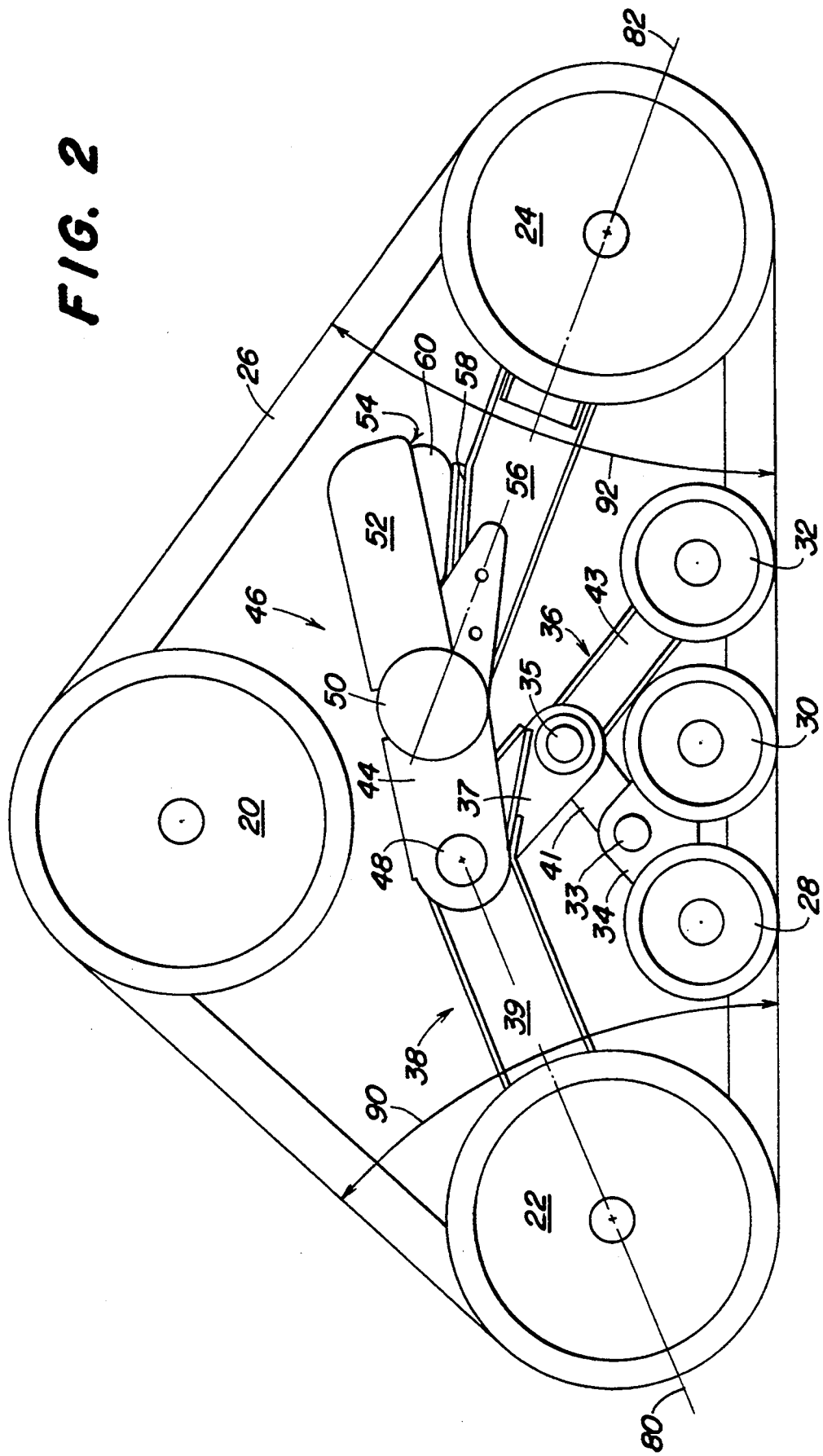

SUSPENSION SYSTEM FOR A TRACKED VEHICLE

RELATED PRIOR APPLICATIONS

The present application is a Continuation-In-Part of U.S. patent application Ser. No. 07/976,090, filed Nov. 13, 1992 pending.

BACKGROUND OF THE

1. Field of the Invention

The present invention is directed to an active suspension system for a tracked vehicle.

2. Description of the Prior Art

Tracks provide vehicles with high floatation in soft field conditions. Steel tracks are by far the most common tracks and comprise an endless chain on which track shoes are mounted. The endless chain engages a main drive wheel sprocket which drives the chain and propels the tracks and vehicle. Belted tracks are also available. One belted track system uses highly tensioned belted tracks. In another belted track system, the tracks are provided with apertures. The apertures engage a main drive sprocket wheel for driving the tracks and propelling the vehicle. A third belted track system uses a specialized main drive wheel to engage centering guide lugs for driving the track.

Various suspension systems for crawlers have also been developed. Track rollers help distribute the load of the vehicle on the track. In a rigid suspension system, the track rollers are directly mounted to the track frame. Loads imparted to the track rollers are directly transferred to the track frame. In an active suspension system, the track frame is provided with a means for dampening the loads imparted to the track rollers which more evenly distributes the load as the tracks encounter obstacles (See U.S. Pat. No. 4,339,156, 4,361,363, 4,373,758 and 4,519,654).

High drive crawlers having an elevated main drive wheel are well known (See U.S. Pat. No. 4,373,758). In addition track technology has been applied to all sorts of agricultural vehicles. For example tractors, grain carts and agricultural combines. It is known to equip agricultural combines used in harvesting rice with half tracks to provide better floatation (See PCT WO 90/05996).

SUMMARY

The present invention is directed to an active suspension system for a track undercarriage. A main drive wheel and two idlers are surrounded by a track. A walking beam having first and second sections is pivotally mounted to the supporting structure of the vehicle by a walking beam pivot. An angled first arm is pivotally coupled to the first section of the walking beam by an angled arm pivot. The first idler is rotatably mounted to the angled arm. The second idler is mounted to a second arm that is pivotally coupled to the supporting structure of the vehicle at the walking beam pivot. A spring is positioned between the second section of the walking beam and the second arm. The second arm is a telescoping arm having a hydraulic cylinder which expands and retracts the arm to tension the tracks.

The angled arm is provided with a first portion and a second portion. The first idler is rotatably mounted to the first portion. First, second and third track rollers are operatively coupled to the second portion of the angled arm. The first and second track rollers are rotatably mounted to a bridging member. The bridging member and the third track roller are respectively mounted to first and second arms of an angled link. The angled link is pivotally mounted to the second portion of the angled arm.

The first idler and the angled arm pivot define a first imaginary line that bisects a first arc formed by the track extending from the first idler to the main drive wheel and the second idler. Similarly, the second idler and the walking beam pivot define a second imaginary line that bisects a second arc formed by the track extending from the second idler to the main drive wheel and the first idler.

BRIEF DESCRIPTION OF THE DRAWINGS

FIG. 2 is an enlarged side view of the half track.

DETAILED DESCRIPTION

Figure 1:
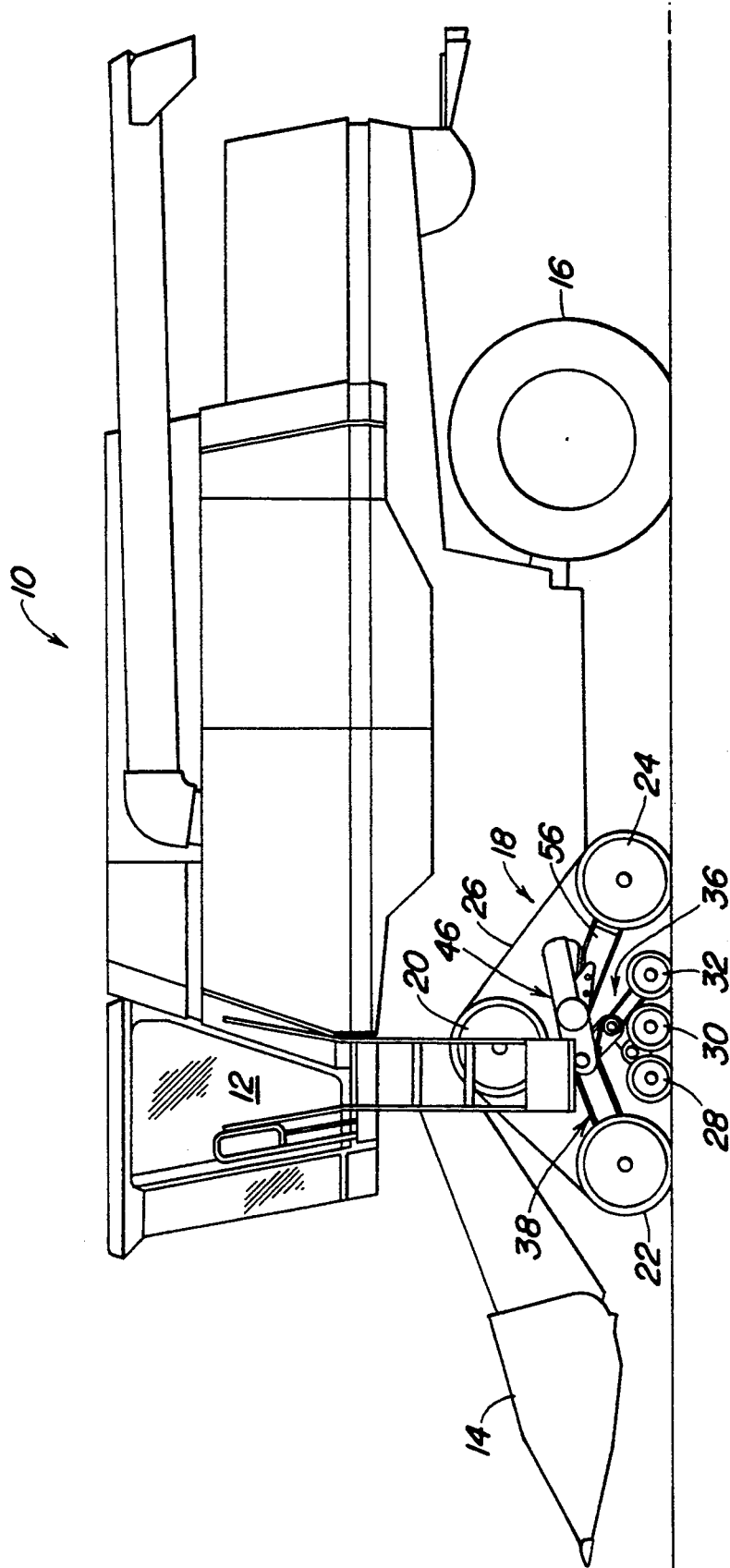
FIG. 1 is a side view of an agricultural combine having a half track.

FIG. 1 is a side view of an agricultural combine 10 having an operator's cab 12, a harvesting platform 14, rear steering wheels 16, and half track propulsion assembly 18. The present invention is described as being a half track propulsion assembly for a combine, for which it is particularly well suited, however the present invention may be used on a variety of tracked vehicles and should only be limited by the claims that follow.

The track propulsion assembly is best illustrated in FIG. 2. The propulsion assembly comprises a main drive wheel 20, a front or first idler 22, and a rear or second idler 24. The first and second idlers define first and second idler axes, respectively. A track 26 surrounds the idlers and the main drive wheel. The track is provided with centering guide lugs that engage the main drive wheel for driving the track and thereby the combine.

The suspension system is provided with three track rollers 28, 30 and 32. The first and second track rollers 28 and 30 are rotatably mounted to bridging member 34. Bridging member 34 is pivotally coupled to a first arm 41 of an angled link 36 at the bridging member pivot 33. The angled link 36 is pivotally coupled to the second portion 37 of angled arm 38 at second portion pivot 35. The first idler 22 is rotatably mounted to the first portion 39 of the angled arm 38. The third track roller 32 is rotatably mounted to the second arm 43 of the angled link 36.

The angled arm 38 is pivotally mounted to the first section 44 of walking beam 46 at angled arm pivot 48. The angled arm pivot is located at the intersection of the first and second portions of the angled arm. Walking beam 46 is pivotally mounted to a frame, not shown, at walking beam pivot 50. The frame is rigidly mounted to the supporting structure of the combine. The second section 52 of walking beam 46 extends rearwardly from walking beam pivot 50 where it is provided with spring receiving cavity 54.

The second idler 24 is rotatably mounted to a second arm 56. The second arm 56 is a telescoping arm having a hydraulic cylinder, not shown. The hydraulic cylinder extends and retracts the telescoping arm for tensioning the track. Second arm 56 is pivotally mounted to the frame at walking beam pivot 50. A spring mounting plate 58 is mounted to arm 56.

A spring 60 is mounted to spring mounting plate 58. The spring is positioned between the second section 52 of walking beam 46 and the second arm 56, so that it projects into spring receiving cavity 54. The spring may comprise a plurality of elastomeric pads, inflatable air bags or other suitable spring assemblies.

The spring 60 biases the second section 52 of the walking beam 46 and the second arm 56 apart. This forces the first section 44 of the beam 46 downwardly. As the first section of beam 46 is pivotally coupled to angled arm 38 the front idler 22 and the track rollers 28, 30 and 32 are also forced downwardly.

The angled arm pivot 48 defines an angled arm pivot axis. A first imaginary line 80 passing through the axis of the first idler 22 and the angled arm pivot axis bisects a first arc 90 formed by a first portion of the track 26 extending between the first idler 22 and the main drive wheel 20 and the first idler 22 and the second idler 24. Similarly, the walking beam pivot 50 defines a walking beam pivot axis. A second imaginary line passing through the axis of the second idler 24 and the walking beam pivot axis bisects a second arc 92 formed by a second portion of the track 26 extending between the second idler and the main drive wheel 20, and the second idler 24 and the first idler 22.

In operation, as the combine moves forward and the track encounters a bump, the front idler 22 rides up the bump pivoting angled arm 38 clockwise about angled arm pivot 48. This pushes angled link 36 downwardly transferring weight to the track rollers 28, 30 an 32. As the front idler crests the bump and is riding down the other side and the track rollers are riding up the bump, the track rollers drive the angled link upwardly, pivoting the angled arm 38 counterclockwise around angled arm pivot 48. Thereby transferring some of the weight back to the front idler as the track rollers ride over the bump. As the rear idler 24 encounters the bump, the second arm pushes up on spring 60 forcing the first section of walking beam 46 downwardly. Thereby transferring some of the weight to the front idler and the track rollers through angled arm 38.

The present invention should not be limited by the above described embodiments, but should be limited solely by the claims that follow.

I claim:

1. An undercarriage for a tracked vehicle comprising:
   a rigid frame;
   a main drive wheel mounted to and extending outward from the rigid frame, the main drive wheel having a main drive wheel axis;
   a walking beam having a first section and a second section is pivotally coupled to the rigid frame by a walking beam pivot which defines a walking beam pivot axis;
   an angled first arm is pivotally coupled to the first section of the walking beam by an angled arm pivot which defines a angled arm pivot axis, the angled arm is provided with a first portion and a second portion with the angled pivot arm pivot being located between these two portions;
   a first idler is rotatably mounted to the first portion of the angled arm, the first idler defining a first idler axis;
   a second arm is pivotally coupled to the rigid frame at the walking beam pivot;
   a second idler is rotatably mounted to the second arm, the second idler defining a second idler axis;
   a spring is located between the second section of the walking beam and the second arm; and
   a track surrounds the main drive wheel, the first idler and the second idler.

2. An undercarriage as defined by claim 1 wherein the second arm is a telescoping arm that can be extended and retracted for tensioning the track.

3. An undercarriage as defined by claim 2 further comprising at least one track roller that is operatively coupled to the second portion of the angled arm, the track roller engaging the track.

4. An undercarriage as defined by claim 2 further comprising first and second track rollers that are operatively coupled to the second portion of the angled arm, the first and second track rollers engaging the track.

5. An undercarriage as defined by claim 4 further comprising a third track roller that is operatively coupled to the second portion of the angled arm, the third track roller engages the track.

6. An undercarriage as defined by claim 5 wherein the first and second track rollers are rotatably mounted to a bridging member, the bridging member is pivotally coupled to a first arm of an angled link, the first link is pivotally coupled to the second portion of the angled arm at the second portion pivot, the second portion pivot defining a second portion pivot axis.

7. An undercarriage as defined by claim 6 wherein the third track roller is rotatably coupled to a second arm of the angled link.

8. An undercarriage for a tracked vehicle comprising:
   a rigid frame;
   a main drive wheel mounted to and extending outward from the rigid frame, the main drive wheel having a main drive wheel axis;
   a walking beam having a first section and a second section is pivotally coupled to the rigid frame by a walking beam pivot which defines a walking beam pivot axis;
   an angled first arm is pivotally coupled to the first section of the walking beam by an angled arm pivot which defines a angled arm pivot axis, the angled arm is provided with a first portion and a second portion with the angled pivot arm pivot being located between these two portions;
   a first idler is rotatably mounted to the first portion of the angled arm, the first idler defining a first idler axis;
   a second arm is pivotally coupled to the rigid frame at the walking beam pivot;
   a second idler rotatably mounted to the second arm, the second idler defining a second idler axis;
   a spring is located between the second section of the walking beam and the second arm; and
   a track surrounds the main drive wheel, the first idler and the second idler, a first portion of the track extends from the first idler to the main drive wheel and from the first idler to the second idler, the first portion of track defining an arc, the first idler axis and the angled arm pivot axis define a first imaginary line that bisects the first arc.

9. An undercarriage as defined by claim 8 wherein the track is provided with a second portion that extends from the second idler to the main drive wheel and the second idler to the first idler, the second portion of track defining a second arc, the second idler axis and the walking beam pivot axis define a second imaginary line that bisects the second arc.

10. An undercarriage for a tracked vehicle comprising:
    a rigid frame;

a main drive wheel mounted to and extending outward from the rigid frame, the main drive wheel having a main drive wheel axis;

a walking beam having a first section and a second section is pivotally coupled to the rigid frame by a walking beam pivot which defines a walking beam pivot axis;

an angled first arm is pivotally coupled to the first section of the walking beam by an angled arm pivot which defines a angled arm pivot axis, the angled arm is provided with a first portion and a second portion with the angled pivot arm pivot being located between these two portions;

a first idler is rotatably mounted to the first portion of the angled arm, the first idler defining a first idler axis;

a second arm is pivotally coupled to the rigid frame at the walking beam pivot;

a second idler is rotatably mounted to the second arm, the second idler defining a second idler axis;

a spring is located between the second section of the walking beam and the second arm; and a track surrounds the main drive wheel, the first idler and the second idler, a second portion of the track extends from the second idler to the main drive wheel and the second idler to the first idler, the second portion of track defining a second arc, the second idler axis and the walking beam pivot axis define a second imaginary line that bisects the second arc.

* * * * *